Nov. 5, 1968
E. H. DOBRATZ
3,409,673
PROCESS FOR PREPARING N,N,N',N'-TETRAKIS (HYDROXYALKYL)-BENZIDINES
Filed Feb. 17, 1966
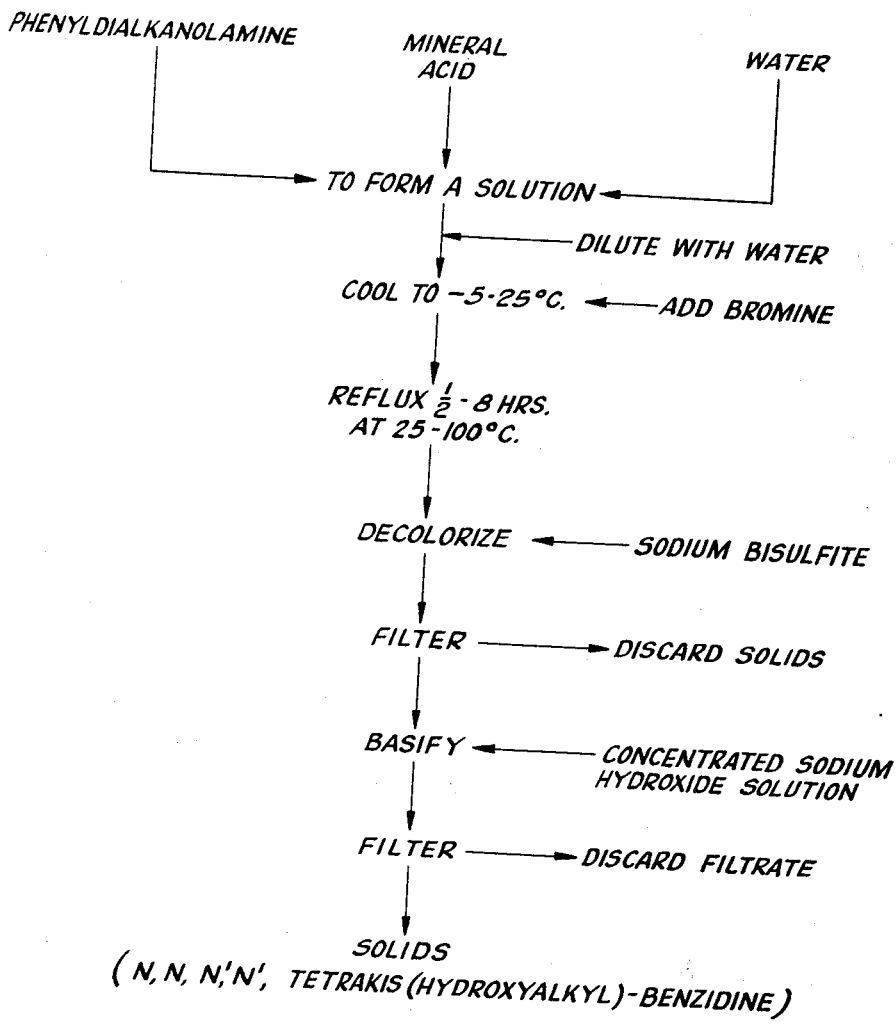
INVENTOR.
ELMER H. DOBRATZ
BY John P. Taylor
his Agent

United States Patent Office 3,409,673
Patented Nov. 5, 1968

3,409,673
PROCESS FOR PREPARING N,N,N',N'-TETRAKIS (HYDROXYALKYL)-BENZIDINES
Elmer H. Dobratz, Pittsburgh, Pa., assignor to Koppers Company, Inc., a corporation of Delaware
Filed Feb. 17, 1966, Ser. No. 528,121
6 Claims. (Cl. 260—573)

ABSTRACT OF THE DISCLOSURE

A process for the production of N,N,N',N'-tetrakis-(hydroxyalkyl)benzidine where the alkyl groups contain 2–8 carbon atoms and comprises acidifying an aqueous mixture of phenyldialkanol amines, adding bromide to the acidified mixture at a temperature of about 5–25° C., adding a reducing agent to the mixture, and then, after filtration, basifying the filtrate to obtain N,N,N',N'-tetrakis(hydroxyalkyl)benzidine.

---

This invention relates to the preparation of N-substituted benzidine compounds, particularly the preparation of N,N,N',N'-tetrakis(hydroxyalkyl)benzidines.

N,N,N',N'-tetrakis(hydroxyalkyl)benzidines are useful in the production of polyester resins and in the preparation of dyestuffs. Heretofore, these compounds have been prepared by addition reactions involving benzidine as a starting material. For example, Journal of the Chemical Society, vol. 1949, page 183 (1949), Ross prepared N,N,N',N'-tetra(2-hydroxyethyl)benzidine by reacting benzidine with ethylene oxide at elevated temperatures.

I have discovered that N,N,N',N'-tetrakis(hydroxyalkyl)benzidines may be produced directly from phenyldialkanolamine by bromination in an aqueous medium.

The production of this compound by bromination is quite surprising and the reaction mechanism is not known. An accepted theory for the halogenation of aromatic amines postulates that before reaction can occur, the amine must assume a planar configuration. As an example, 2,4,6-tribromoaniline is rapidly formed when aniline is brominated in aqueous solution indicating that aniline readily assumes the planar configuration, e.g.,

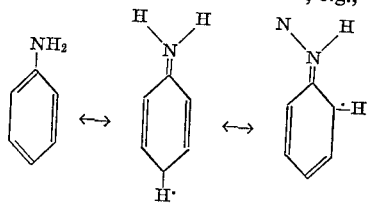

These two planar resonance structures explain why the ortho and para positions of aniline are attacked.

In accordance with this invention a phenyldialkanolamine such as phenyldiethanolamine (N-phenyl-2,2'-iminodiethanol) is subject to bromination, but the failure of N-phenyl-2,2'-iminodiethanol hydrochloride to brominate readily in aqueous solution could indicate that the bulky 2-hydroxyethyl groups by colliding with the ortho hydrogens sterically interfere with the information of the planar resonance structures thus preventing bromination:

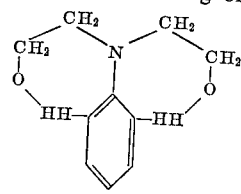

However, it is possible and, on the basis of experimental results, highly probable that a planar resonance structure does form and that the planar resonance structure is stabilized by hydrogen bonding of the ortho hydrogens to the hydroxyl oxygens, forming 7-membered rings, e.g.,

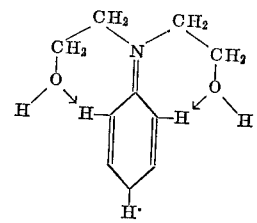

Although both ortho positions are effectively blocked in the above planar structure the para position is still open to attack. If free-radical bromination does occur at the para position and stabilization by hydrogen bonding is strong enough the resulting compound is a bromo imino quinone from which the bromine and diethanolamine should be rapidly hydrolyzed to give quinone itself.

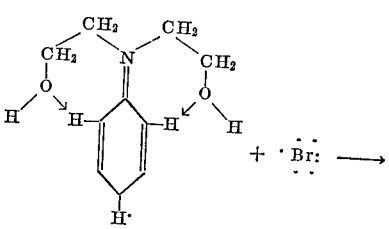

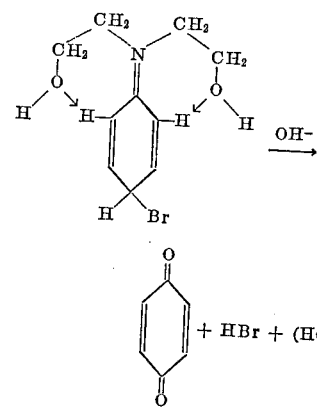

Mixed bromoquinone and bromophenols were isolated from the reaction mixture.

The stabilized planar resonance structure also explains the formation of the major reaction product, N,N,N',N'-tetrakis(2-hydroxyethyl)benzidine, that apparently results from oxidative coupling wherein bromine is the oxidizing agent, e.g.,

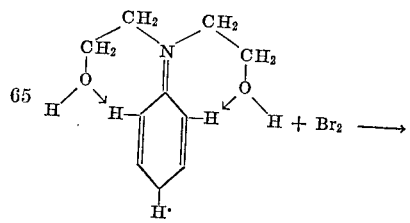

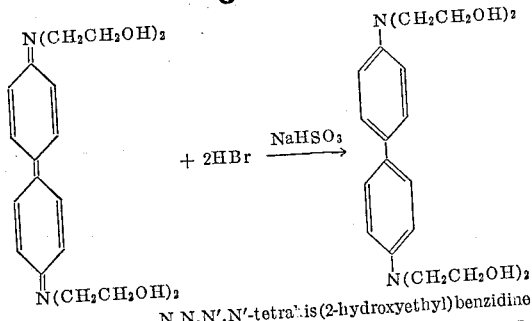

In the addition of bromine to aqueous solutions of N-phenyl-2,2'-iminodiethanol hydrochloride, a deep burgundy red color soon develops. In all probability the formation of N,N,N',N'-tetrakis(2-hydroxyethyldiiminodiphenoquinone is responsible for the color, which can be completely discharged by reduction with sodium bisulfite. On making the solution alkaline N,N,N',N'-(2-hydroxyethyl)benzidine precipitates. If the color is not first discharged with sodium bisulfite, a lower yield of tar-contaminated benzidine product results. Yields in the amount of 60 percent of theory of the N,N,N',N'-(2-hydroxyalkyl)benzidines are readily obtained.

In accordance with this invention an N-substituted benzidine compound of the formula

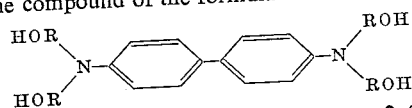

wherein R is an alkyl group having from 2–8 carbon atoms and each R may be the same or a different alkyl group is produced by brominating in an aqueous acidic medium a phenyldialkanolamine having the formula

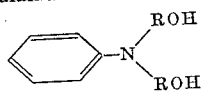

wherein R is an alkyl group having from 2–8 carbon atoms in the alkyl chain and wherein the alkyl groups may have the same or different numbers of carbon atoms; adding a reducing agent to break-up the intermediate Br complex in the reaction mass, separating the soluble intermediate from the reaction mass and basifying the solution to recover the product, N,N,N',N'-tetrakis(hydroxyalkyl)benzidine.

The choice of the starting phenyldialkanolamines for my novel process depends upon the desired product. If each R is to be the same alkyl group, e.g. ethyl, then phenyldiethanolamine is used as the only starting material. However, when the alkyl groups are not the same then the starting material used is a mixture of amines, i.e.,

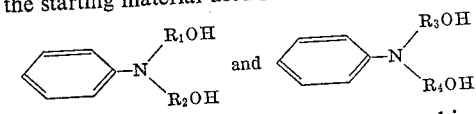

In the preferred process, the amine compound is mixed with water that is acidified by the addition of a mineral acid, preferably hydrochloric acid or hydrobromic acid, and is brominated by the addition of bromine, as a liquid, an aqueous solution or gas. The mixture is maintained at about −5 to 25° C. during the bromination and usually is maintained at −5 to 15° C., preferably −2 to +2° C. The bromine is added to the amine slowly, for example, over a period of from about one-half to about eight hours. After all the bromine has been added, the temperature is allowed to rise to about from 50–60° C. to as high as 100° C., but preferably to about 55° C. and the mixture is maintained at this temperature under reflux conditions for about 1–3 hours.

The reaction of the amino compounds with bromine imparts a very dark color to the reaction mass. This is thought to be due to the formation of a complex between the amino compound and the bromine. The reaction mass takes on the characteristic of a slurry. The addition of a reducing agent, such as sodium bisulfite or sulfurdioxide, decolorizes the liquid portion of the reaction mass and appears to solubilize a portion of the mass. The liquid component of the reaction mass is removed, preferably by filtering and the liquid component rendered basic by addition of a base, such as sodium hydroxide, until a pH of about 10–12 is reached. The N,N,N',N'-tetrakis(hydroxyalkyl)benzidine product precipitates as a yellow solid as the solution becomes basic. This product is then separated from the liquid.

The general process of this invention is illustrated by flow diagram in the drawing.

The following examples will also serve to illustrate the invention:

Example I 92.3 g. (0.51 mole) phenyldiethanolamine, 50 ml. (0.6 mole) of 37.2 percent hydrochloric acid and 450 ml. of water were mixed in a three liter, three-necked flask equipped with an agitator, thermometer and a reflux condenser. After solution was complete it was diluted with an additional 1500 ml. of water. The flask was placed in an ice-bath for cooling and 250 g. (1.56 moles) of liquid bromine was then added slowly over a period of 37 minutes to the phenyldiethanolamine solution which was maintained at 13–16° C. during this time. A dark burgundy red color developed in the solution and solids precipitated. After the bromine addition was complete, the reaction mass was heated to 56° C. and maintained at this temperature for an hour. Then the reaction mass was cooled to 30° C. and the reaction mass was treated was 39.5 g. of sodium bisulfite which discharged the red color, leaving a brown solid in suspension. The solids were removed by filtration and the pH of the filtrate was adjusted to approximately 10 with 25 percent sodium hydroxide solution whereupon a pale yellow solid precipitated. The solid was removed by filtration, washed with water and dried. The solid weighed 35.6 g. The solid was purified by recrystallization from alcohol. Its infrared spectrum, elemental analysis, the proton magnetic spectrum and melting point, M.P. 179–181° established that the product was N,N,N',N'-tetrakis(2-hydroxyethyl)benzidine.

Example II

Following the procedure of Example I a solution was made of 92.3 g. (0.51 mole) phenyldiethanolamine, 50 ml. (0.6 mole) of 37.2 percent hydrochloric acid and 450 ml. of water. 1.6 moles of liquid bromine was added to the mixture at 8–14° C. over a period of three hours. After the addition of the bromine was completed the mixture was agitated at ambient temperature for two hours. The mixture was then treated with 40 grams of sodium bisulfite and filtered. The filtrate was adjusted to a pH of about ten with 25 percent aqueous sodium hydroxide solution. The resulting precipitate was separated from the liquid by filtration and washed with water. 59 grams (65 percent of theory) of product was collected. Analysis confirmed the product to be N,N,N',N'-tetrakis-(2-hydroxyethyl)benzidine.

Example III

Following the procedure of Example I a solution was made of 92.3 g. (0.51 mole) phenyldiethanolamine, 50 ml. (0.6 mole) of 37.2 percent hydrochloric acid and 450 ml. of water. Thereafter, bromine vapor equivalent to 1.6 moles of bromine was blown beneath the liquid surface with nitrogen over a five hour period. The mixture was maintained at a temperature of 11–21° C. during this period. The bisulfite treatment, used in Examples I and II, was omitted and after stirring for eight hours at room temperature and standing overnight a tarry mass had separated from the reaction mass. After heating to 95° C. the aqeuous phase was removed by decantation.

After adjusting the pH of this aqueous phase to 9–10 with 25 percent sodium hydroxide a solid precipitated. The solution was filtered from the solid and the solid washed with water. The solid was dried. There was obtained 56 grams (62 percent of theory) of N,N,N′,N′-tetrakis(2-hydroxyethyl)benzidine.

Example IV

Example III was repeated using ten percent excess bromine (1.8 moles). There was obtained 56 grams of crude N,N,N′,N′-tetrakis(2-hydroxyethyl)benzidine. Extraction of the alkaline filtrate with ether produced no additional benzidine.

Example V

A solution of 150 g. (0.83 mole) of N-phenyldiethanolamine in 1000 ml. of water and 0.66 mole of 49 percent hydrobromic acid was prepared. Thereafter 1.27 moles of bromine vapor was blown beneath the liquid surface with nitrogen over an eight hour period, maintaining the temperature at −1 to +2° C. The mixture was then treated with 72 g. of sodium bisulfite and filtered. The filtrate was adjusted to pH of about 12 with 36 percent sodium hydroxide solution. The resulting slurry was heated at 90° for three hours and was then cooled and filtered. The solid was washed with water. The washed solid was then slurried in 600 ml. of acetone and was stirred at the boiling point for five hours. After cooling the solid was removed by filtration, washed with acetone and dried. There was obtained 100.5 (67.5 percent of theory) of white N,N,N′,N′-tetrakis(2-hydroxyethyl)benzidine that melted at 181–185° C.

Example VI

A solution of 181 g. (one mole) of N-phenyldiethanolamine in 900 ml. of water and 110 ml. (one mole) of 49 percent hydrobromic acid was prepared. Thereafter 1.35 moles of bromine vapor was blown beneath the stirred liquid surface with nitrogen over an 8.5 hour period, maintaining the temperature at −5 to 1° C. The mixture was then treated with 45 g. of sodium bisulfite and filtered. The filtrate was adjusted to pH of about 12 with 36 percent sodium hydroxide and was heated and stirred at 90–95° for 1.5 hours. After cooling the solid was removed by filtration and was washed with water. The washed solid was slurried in a 500 ml. of ethanol and was stirred and heated at reflux for five hours. After cooling the solid was removed by filtration, washed and dried. There was obtained 111.1 g. (61.7 percent of theory) of N,N,N′,N′-tetrakis(2-hydroxyethyl)benzidine that melted at 181–182°.

I claim:
1. Process for preparation of N,N,N′,N′-tetrakis(hydroxyalkyl)benzidine having the formula

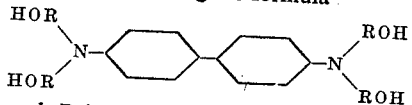

wherein each R is the same or different alkyl group having from 2–8 carbon atoms comprising:
(a) acidifying an aqueous mixture of phenyldialkanolamines having the structure

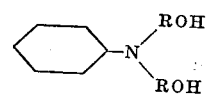

wherein each R is the same or different alkyl group having from 2–8 carbon atoms,
(b) adding bromine to said mixture, thereafter
(c) adding a reducing agent to said mixture,
(d) filtering said mixture, and
(e) basifying the filtrate to obtain said N,N,N′,N′-tetrakis(hydroxyalkyl)benzidine.
2. Process of claim 1 wherein the mixture is maintained at a temperature about 5–25° C. during the bromine addition.
3. Process of claim 1 wherein the bromine is added over a period of time from about one-half hour to about eight hours.
4. Process of claim 1 wherein the mixture is refluxed at a temperature of from about 50° C. to 100° C. for about one to three hours after the bromine addition.
5. Process of claim 1 wherein the mixture is reduced by the addition of a reducing agent selected from the group consisting of sodium bisulfite and sulfurdioxide.
6. Process of claim 1 wherein the pH of the mixture after the bromine addition is adjusted to between ten and twelve to obtain said N,N,N′,N′-tetrakis(hydroxyalkyl)benzidine as precipitate.

No references cited.

CHARLES B. PARKER, *Primary Examiner.*
P. C. IVES, *Assistant Examiner.*